April 13, 1926. Re. 16,323

M. J. WEBER

WEIGHING SCALE

Original Filed Jan. 19, 1917 3 Sheets-Sheet 1

Inventor:

Mathias J. Weber

By:

Munday, Clarke and Carpenter

Atty's

April 13, 1926. Re. 16,323

M. J. WEBER

WEIGHING SCALE

Original Filed Jan. 19, 1917 3 Sheets-Sheet 2

Inventor
Mathias J. Weber
By
Munday, Clarke & Carpenter
Atty's

April 13, 1926. Re. 16,323

M. J. WEBER

WEIGHING SCALE

Original Filed Jan. 19, 1917 3 Sheets-Sheet 3

Inventor:
Mathias J. Weber

By:
Munday, Clarke and Carpenter Atty's

Reissued Apr. 13, 1926. Re. 16,323

UNITED STATES PATENT OFFICE.

MATHIAS J. WEBER, OF CHICAGO, ILLINOIS, ASSIGNOR, BY MESNE ASSIGNMENTS, TO THE HEALTHOMETER CO., A CORPORATION OF ILLINOIS.

WEIGHING SCALE.

Original No. 1,249,262, dated December 4, 1917, Serial No. 143,247, filed January 19, 1917. Application for reissue filed November 27, 1925. Serial No. 71,787.

*To all whom it may concern:*

Be it known that I, MATHIAS J. WEBER, a citizen of the United States, and a resident of the city of Chicago, in the county of Cook and State of Illinois, have invented a certain new and useful Improvement in Weighing Scales; and I do hereby declare that the following description of my said invention, taken in connection with the accompanying sheets of drawings, forms a full, clear, and exact specification, which will enable others skilled in the art to which it appertains to make and use the same.

My invention relates generally to improvements in weighing scales, and it consists, essentially, in the novel and peculiar combination of parts and details of construction, as hereinafter first fully set forth and described and then pointed out in the claims.

The object of my present invention is the production of an efficient and serviceable weighing scales which, although well adapted for general use as a counter scales, is more especially designed for automatically taking the weight of humans; and for this purpose, the scales is to be preferably placed onto a floor so that a person, desiring to ascertain his weight, can readily step upon the scale platform and by looking down onto a rotatable, indexed dial, can see how much he weighs. And for the purpose of making these scales very compact and readily portable, the scale mechanism is of the spring-type construction which lends itself best to the purposes for which my invention is designed.

Figure 1:
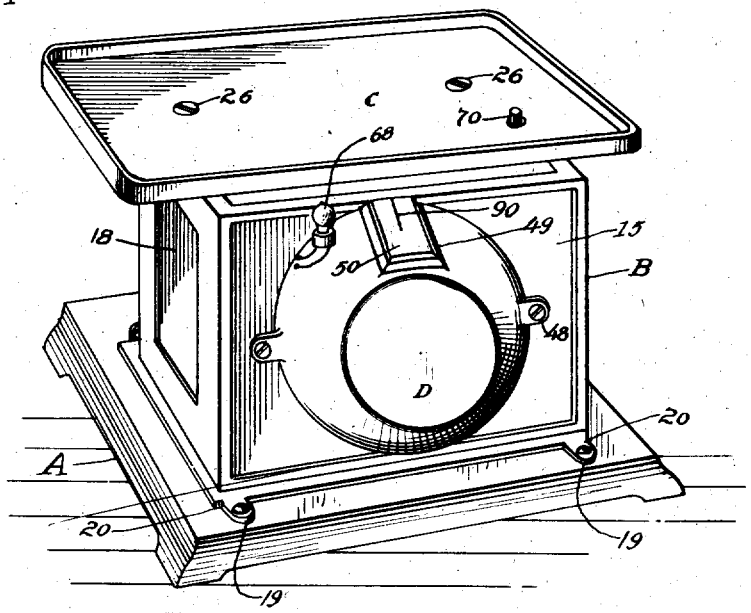
Figure 2:
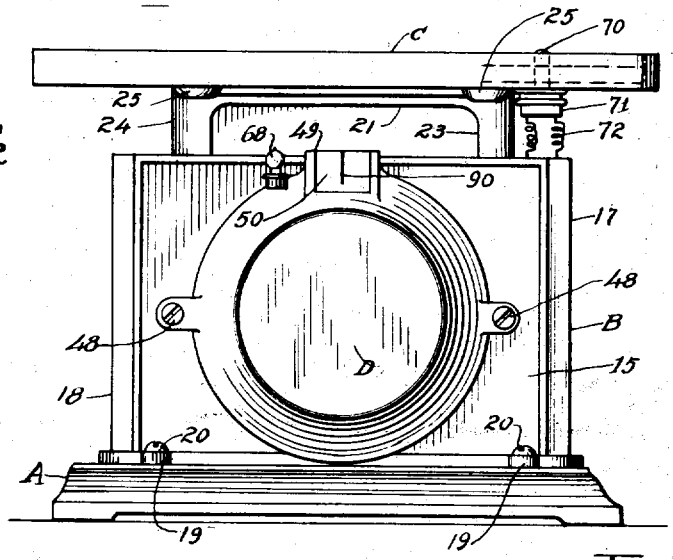
Figure 3:
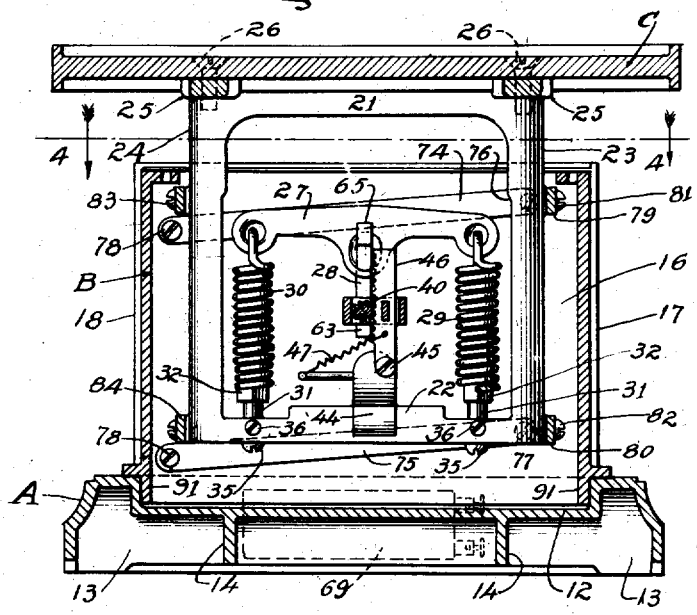
Figure 4:
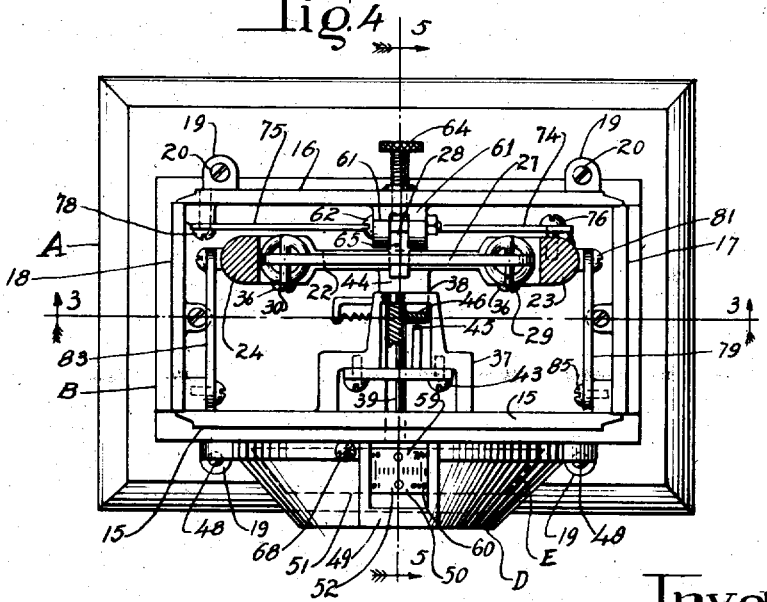
Figure 5:
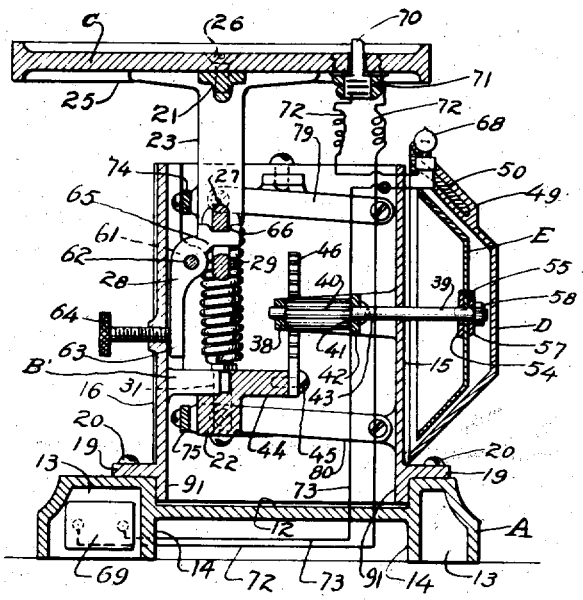
Figure 8:
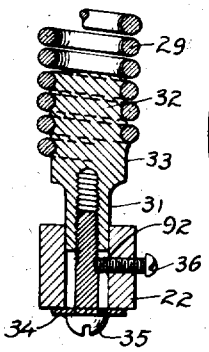
Figure 6:
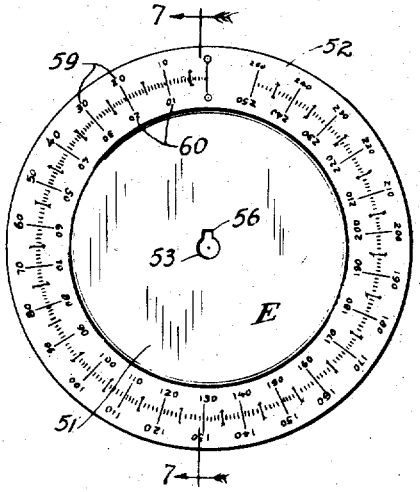
Figure 7:
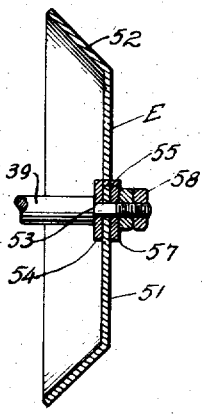

In the drawings, which disclose the preferred embodiment of my invention, and which form a part of this specification, Figure 1 is a perspective view of my improved scales. Fig. 2 is a front elevation of the same. Fig. 3 is a longitudinal vertical section on line 3—3 of Fig. 4. Fig. 4 is a plan view below the line 4—4 of Fig. 3. Fig. 5 is a transverse sectional view on line 5—5 of Fig. 4. Fig. 6 is a front elevation of the rotatable dial detached, and Fig. 7 is a vertical section of the same on line 7—7 of Fig. 6. Fig. 8 is a detail sectional view of a fragment of one of the springs used in this apparatus, and showing the means for tensioning this spring.

In these drawings, A designates the base of the scales. This base is a substantially rectangular shell having in its top surface a depression 12, and in its body several compartments 13, formed by longitudinal and transverse ribs or bars 14, which ribs serve also as strengthening bars to the structure A. Upon this base there is mounted a casing or housing B, comprising two side, and two end walls 15, 16, 17 and 18, respectively, said walls having laterally extending lugs 19, receiving screws 20, by which the casing is securely fastened to the base A.

C is the platform upon which the goods, or the person to be weighed are placed. This platform is rectangular in contour, and it is supported upon a substantially rectangular, preferably integrally formed frame, comprising a top member 21, a bottom member 22, right side-bar 23, and left side-bar 24. This top member 21 has laterally extending lugs or flanges 25, the platform being secured to said top member by screws 26. Below this top member 21 there is located in the casing a beam 27, which beam is medially suspended from a bell crank lever 28, to be hereinafter more fully set forth. The two extremities of the beam 27 are punctured, and in these openings there are secured tensioned springs 29, 30, with one of their ends, the other ends of said springs being hitched to the bottom member 22 of the rectangular frame in a peculiar manner, as follows:

Within the lower portion of each spring there is secured a bolt 31, shown in detail in Fig. 8, which bolt has a comparatively long head 32, which head is externally screw-threaded to engage the interior convolutions of said spring. Below this head there is a polygonal wrench section 33, and the shank of this bolt, which enters a bore 34, in the lower member 22 of the rectangular frame, is internally screw-threaded to be engaged by an adjusting screw 35; while a seat screw 36, acting on said screw when applied, prevents said bolt from rotating, which would disturb the tension of said spring. This peculiar method of attaching the lower ends of the springs 29, 30, to the bottom member, affords means for properly adjusting the tension of said springs, so as to indicate weight correctly; it being understood that these springs are made of a suitable grade of tempered steel of a fixed external diameter and proper thickness, and having a suitable number of turns or convolutions, so as to sustain a maximum load with a fixed limit of expansion, a matter which, by repeated trials, can be readily accomplished.

Extending into the casing there projects from the front wall 15 thereof a bracket 37, the inner end 28 of which has a bearing in which there is rotatably mounted a shaft 39, having a pinion 40, there being in said bracket 37 an offset portion 41, in which a bearing plate 42, is secured by screws 43, said bearing plate supporting said pinion shaft near the front wall of the casing C.

From the forward face of the lower, or bottom member 22 extends forwardly, a bracket 44 and to this bracket there is pivoted, by a pivot bolt 45, a toothed rack 46, which engages with the pinion 40, a spring 47 being provided to keep the rack and pinions in proper mesh.

To the outer face of the front plate 15 of the casing, there is secured, preferably by bolts 48, a cap D, dish-shaped in contour, there being at the apex of said cap a window frame 49, in which there is a transparent plate 50. Within this cap D there is located a rotatable dial E, shown in detail in Figs. 6 and 7. This dial is a dish-shaped structure of preferably thin sheet metal so as to be very light; and from its bottom 51 extends a rim 52, at an angle of approximately 45 degrees, to the plane of the bottom. This bottom is centrally punctured at 53, Fig. 6, and the outer end of the pinion shaft 39 is reduced in diameter, and over this reduced portion the dial is placed, bottom side out, as shown in Fig. 5.

Scales of the nature described are rather roughly used; articles to be weighed being usually placed onto the platform rather carelessly, and often thrown thereon, which causes the dial to rotate rather suddenly and rapidly, so that the inertia of the dial, resisting rotation, may cause the dial to become loose on the pinion shaft. To avoid this objection, I exteriorly roughen or groove the reduced portion of the shaft 39 adjacent to the shoulder thereon, and onto this roughened portion 53 I force a washer 54, having a projecting nose or dog 55, passing through the elongated portion or slot 56, Fig. 6, in the bottom of the dial; a second washer 57, and lock-nuts 58, on the outer surface of the bottom 51 being provided to securely lock the dial to the pinion shaft.

The dial E is graduated on the outer peripheral surface of the rim 52, into preferably 250 divisions, the maximum capacity of the present scales being 250 lbs., and the indices are so placed that one series thereof, 59, is located near the marginal edge of the rim, so that it will read right when viewed from the front of the scales, while the second series of indices 60, is located near the jointure of the rim of the bottom, and this series of indices reads right to a party standing on the platform C and looking down on the dial, a hair-line 9C, drawn on the transparent plate 50 serving as an index-pointer. By thus constructing the dial the reading thereof can be ascertained by a person standing on the platform, and by another person or persons standing in front of the scales, all at the same time.

I have heretofore referred to the bell crank lever 28, and shall now proceed to describe its construction and its function.

From the back plate 16 of the casing projects two lugs or ears 61, wherein the bell crank lever is pivoted upon a bolt 62. The long arm of this bell crank lever extends downwardly, and it is acted upon by an adjusting screw 64. The other, shorter arm 65, of said bell crank lever is offset and notched near its terminal, and in this notch 66, the beam 27 is suspended.

The object of the adjusting screw 64 acting on the long arm of the bell crank lever is to raise or lower the beam, and with it and the springs 29, 30, move the rectangular frame and the rack and pinion, and the dial accordingly so that by manipulating this adjusting screw 64, the dial can be brought to the zero mark when there is no weight on the platform, which is necessary when assembling the scale mechanism, and may also become necessary after the scales have been in use for some time. Since moving the beam 27 as described moves with it the entire rectangular frame and the platform, this movement does not affect the tension of the springs, nor the accuracy of the scales.

When the scales are placed upon a floor, it is more or less difficult for a person standing on the platform to read the index on the dial owing to the fact that there is frequently not sufficient light to see the index. To overcome this objection, I provide means for lighting the dial, such means including a small electric incandescent lamp 68, placed at the side of the window frame 49, a battery 69, located in one of the compartments 13 in the base A, a push button 70 projecting from the upper surface of the platform, a switch 71, located underneath the platform, electric conducting wires 72, leading from the battery to the switch, and thence to the lamp, and a return wire 73, leading back to the battery. By these means a person stepping onto the platform will step onto the push button 70, thereby closing the electric circuit and cause the incandescent lamp to glow so that he can plainly read the index on the dial. When stepping off the platform, the electric circuit is opened and the lamp extinguished.

In order to properly guide the rectangular frame with its superposed platform in their vertical movement, and with the least possible frictional resistance, I resort to the following mechanism:

Connected to the side member 23 of the rectangular frame are two links, 74, 75, the former link being pivoted to said side member at one end by a pivot bolt 76, and the latter link being pivoted to said side member at the lower end thereof by a pivot bolt 77. The other ends of said links are pivoted to the back wall of the casing by pivot bolts 78. These two links form, as it were, a parallelogram, and as such guide said rectangular frame in one direction.

Connected to side member 23 at right angles to the links 74, 75, are two transverse links 79, 80, the link 79 being pivoted at one end to the member 23 by a bolt 81, while the link 80 is pivoted at one end to said member 23 by a pivot bolt 82, the other ends of said links being pivoted to the end member 17 of the casing B, by pivot bolts 85. To the side member 24 of the rectangular frame there are pivoted links 83, 84, the arrangement of the pivotal connections being the same as that of the links 80, 81, so that the two pairs of links 79, 80, and 83, 84, guide said rectangular frame in the other direction.

It is obvious that by thus guiding the rectangular frame and the platform attached thereto, I have reduced friction to a minimum, so much so as not to affect the accuracy of the scales to an appreciable extent.

I have heretofore stated that the base A has in its top surface a depression 12. This depression serves to receive extensions 91 on the front, rear, and side walls of the casing B, whereby said casing is strongly supported on said base and prevented from lateral movement thereon, a construction which adds materially to the rigidity of the entire structure.

The function of the adjusting mechanism, shown in detail in Fig. 8 and hereinbefore described, is best explained by reference to Figs. 3 and 5 of the drawings. In the adjustment and tensioning of the springs 29, when the scale is just assembled, the rectangular frame comprising the top member 21, bottom member 22, right side bar 23 and left side bar 24, is positioned with the bottom or basal member 22 barely touching the under side of an abutment B′, which in the present instance is preferably formed as a lug integral with and projecting inwardly from the casing wall 16. By reference to Fig. 3, it will be seen that the upper end of each coil spring is secured through the eye of the pivoted beam 27, and the lower end of the coil spring is connected by means of the adjusting mechanism shown in Fig. 8 to the lower member 22 of the rectangular frame. With the frame in the position just described there must be no back tension in the springs 29 and 30, that is, there should be no reaction, due to the springs, on the indicator dial. In order to regulate and adjust the scales, a predetermined weight is placed on the scale platform, say two hundred and fifty pounds. If the scales register incorrectly, the tension adjusting means is manipulated until the scales register correctly. For instance, if the scale should register two hundred and seventy-five pounds for the two hundred and fifty pound weight, the springs are shortened by applying an instrument to the angular-shaped shoulder 33 of the bolt 32, whereby to thread the bolt shank into the convolutions of the spring, whereby to shorten the spring, lessening its number of effective or working coils. This adjustment is continued until the scales read correctly. But, having changed the number of effective coils, we have also correspondingly altered the distance between the eye of the beam 27, to which the upper spring is hitched, and the lower member 22 of the rectangular form. An inspection of Fig. 8 will at once make clear that this is due to the fact that as the shank 32 of the bolt screws into the convolutions of the spring, it necessarily carries with it, through the intermediary of the adjusting screw 35 having threaded connection with the internally threaded portion 31 of the shank, the lower member 22 of the rectangular frame. And when this lower member 22 is carried upwardly it disturbs the previous predetermined or set relation of this lower member 22 with respect to the abutment B′. The disturbance of this set position is more clearly illustrated should the adjustment of the shank 32 be in the opposite direction, that is, if we lengthen the effective length of each spring 29, the shank 33 will be moved downwardly, thus carrying the base member 22 of the frame away from lug or abutment B′. It is vital that the initial position of this base member 22 barely touching the under side of the abutment B′, be maintained at all times for the proper operation and registration of the scale.

In order to again restore this predetermined position of the base member 22 with respect to this abutment B′, after the effective working length, or, what is the same thing, the tension of the springs 29 and 30 have been adjusted by screwing the shank 32 of the bolt relatively into or out of the convolutions of the spring, resort is had to the adjusting screw 35, which screws into the internally threaded portion 31 of the shank. For instance, during the beforementioned adjustment of the tensions of these springs, if the base member 22 has been moved downwardly or away from the abutment B′, the adjusting member 35 is rotated to screw into bolt 32, thereby moving the base member 22 upwardly until it barely touches the under side of the abutment B′. This latter adjustment serves to always maintain a fixed distance between the eye of the beam 27 and the base member 22, to wit: the effective or working length of the spring with its connection with beam 27 plus the length of the adjusting means including the internally threaded shank 31 and the adjusting screw 35 engaging this lower member 22. The function of the said screw 36 is to preclude inadvertent turning of the adjusting screw 35, thereby preserving the proper adjustment of the scale and also preventing the adjusting screw 35 working loose from its threaded engagement with shank 33 during shipment.

I have, furthermore, shown the incandescent electric lamp 68 placed at the side of the window frame 49; but it is obvious that this lamp may be placed directly over said window frame, as illustrated in Fig. 5, or in any other convenient position.

I have heretofore described with considerable minuteness the preferred embodiment of my invention, but I desire it to be understood that many of the details of construction may be varied, and parts omitted without departing from the scope of my invention as defined in the subjoined claims.

Having thus fully described this invention, I claim as new, and desire to secure to myself by Letters Patent of the United States—

1. In weighing scales of the nature described, the combination, of a casing, a rectangular frame in said casing, said rectangular frame having top, bottom, and side members, said rectangular frame being pivotally mounted in said casing, a platform mounted on said rectangular frame, a beam suspended in said rectangular frame below said top member, springs hitched to the extremities of said beam at one of their ends and to the bottom member aforesaid at their other ends, a rack pivotally secured to said bottom member, a shaft in said casing, said shaft having a pinion engaging said rack, and a dial mounted on the outer end of said shaft, said dial comprising a plane circular bottom and a flaring rim thereon, there being on the outer surface of said rim two series of indicia indicating weight.

2. In weighing scales of the nature described, the combination, of a casing, a rectangular frame in said casing, a beam in said casing, springs connected to said beam and to said rectangular frame, a rack bar connected to said frame, said rack bar moving in a vertical plane, a shaft rotatably mounted in said casing, said shaft being in horizontally disposed position, a pinion on said shaft meshing with said rack bar, a dial at the outer end of said shaft, said dial being constructed to rotate in a vertical plane, a bell crank lever pivotally mounted in said casing, said beam being medially suspended from one arm of said bell crank lever, and an adjusting screw constructed to act on the other arm of said bell crank lever to move said frame in vertical direction, said adjusting screw passing through, and projecting from, the rear wall of said casing.

3. In weighing scales of the nature described, the combination, of a base, a casing mounted on said base, a platform above said casing, spring-actuated mechanism located in said casing, a rotatable dial in front of said casing and connected to said spring-actuated mechanism, said dial comprising an annular disk, an annular rim on said disk, said rim having a conical surface, said surface being at an angle of approximately 45 degrees to the plane of the disk, indices on the outer surface of said rim, said indices including two series of numerals, one series being readable correctly from one position, the other series being correctly readable from a different position.

4. In weighing scales of the nature described, the combination, of a casing, weighing mechanism mounted in said casing, and a rotating dial connected to said weighing mechanism, said dial comprising an annular disk, an annular rim on said disk, said rim having a conical surface, said surface being at an angle of approximately 45 degrees to the plane of said disk, there being on the outer surface of said rim two concentric circles of numerals, one of these circles of numerals being correctly readable from one position, the other of said circles of numerals being correctly readable from a different position.

5. In weighing scales of the nature described, the combination, of a base, a casing mounted on said base, weighing mechanism in said casing, a platform above said casing and connected to said weighing mechanism, a rotating dial in front of said casing, said dial being connected to said weighing mechanism, a switch on said platform, said switch having a push-button protruding from said platform, an electric battery in said base, an incandescent electric lamp in front of said dial, an open, electrical circuit connecting said battery to said switch and said lamp, said circuit being closed when a person steps onto said push button, and again opened when said person steps off the platform.

6. A platform scales having automatically operating mechanism for lighting and extinguishing an electric lamp when an article is placed on the platform of said scales, and removed therefrom, said mechanism including an element projecting above the said platform, which element when depressed by an article placed on said platform will close an electric circuit to light said lamp.

7. In weighing scales, weighing mechanism including a platform, an electric incandescent lamp connected to said scales, and automatically operating means connected to said platform for lighting said lamp when an article is placed onto said platform, and extinguishing the same when said article is removed from said platform, said electrically operating mechansm including a switch secured to said platform, said switch having an element above said platform constructed to be depressed to close an electric circuit to light said lamp when an article is placed on said platform onto said element, and to open said electric circuit when said article is removed from said platform, to extinguish said lamp.

8. In weighing scales of the nature described, the combination of a housing, a stationary abutment thereon, a rectangular frame pivotally mounted in said housing and adapted to be initially positioned so that one of the members of said frame shall have a predetermined position relative to said abutment, a beam pivotally suspended in said housing, springs connected to said beam and said rectangular frame and means for regulating the effective length of said springs and for maintaining the predetermined position of said frame member relative to the abutment comprising a bolt having a tubular internally screw threaded shank, a head on said shank, said head being externally screw threaded to engage the internal convolutions of said spring, an adjusting screw engaging the said tubular screw threaded shank and a set screw acting on said adjusting screw to prevent inadvertent rotation thereof.

9. In weighing scales of the nature described, the combination of a housing, a stationary abutment thereon, a rectangular frame pivotally mounted in said housing so that one of the members of said frame shall have a predetermined initial position relative to said abutment, a beam pivotally suspended in said housing, springs connected to said beam and said rectangular frame, and means for regulating the tension of said springs and for maintaining the predetermined position of said frame member relative to said abutment comprising bolts each having a head provided with a screw thread to engage the convolutions of a spring, and each provided with an angularly shaped portion for turning the bolt, whereby to adjust the screw threaded portion thereof relatively to the convolutions of a spring, a threaded adjusting member engaging each bolt shank and passing through a perforation in the bottom member of said rectangular frame, means on each adjusting member adapted to engage the under surface of the lower member of said rectangular frame, each adjusting member being constructed and arranged to be turned, and a locking means engaging each adjusting member to prevent inadvertent turning thereof.

10. In weighing scales of the nature described, the combination of a housing, a stationary abutment thereon, a rectangular frame comprising top, bottom and side members pivotally mounted in said housing so that the bottom member shall initially have a predetermined position relative to said abutment, a beam pivotally suspended in said housing, springs, and means connecting said springs to the outer ends of said beam and to the bottom member of said rectangular frame, said means comprising a bolt having a shank portion formed with a screw thread for adjustably engaging the convolutions of said spring and formed with a portion constructed and arranged to be engaged by a tool for turning said shank, an adjusting screw connected to said bolt shank, and a set screw for preventing the inadvertent rotation of said adjusting screw.

11. In weighing scales of the nature described, the combination of a casing having a stationary abutment thereon, a rectangular frame in said casing, said rectangular frame having top, bottom and side members, said rectangular frame being pivotally mounted in said casing so that the lower member of said frame shall have an initial predetermined position relative to said abutment, a platform mounted on said rectangular frame, a beam suspended in said rectangular frame below said top member, coil springs hitched to the extremities of said beams at their upper ends and to the bottom member of said rectangular frame at their lower ends, means for regulating the tension of the springs and for maintaining the predetermined initial position of said frame member relative to said adjustment, comprising bolts, each having a shank formed with a screw thread adjustably to engage the convolutions of a spring and each provided with a portion constructed and arranged to be engaged by a tool for turning the shank, a threaded member adjustably connecting each shank to the bottom member of the rectangular frame, each threaded member passing through a bore in the bottom member in the rectangular frame and having means at its end by which it may be turned by an instrument, and a locking device engaging each threaded member for preventing inadvertent rotation thereof.

12. In a weighing scale of the nature described, the combination of a housing provided with a stationary abutment, a rectangular frame comprising top, bottom and side members pivotally mounted in said housing so that one of the members of said frame shall have an initially predetermined position relative to said abutment, springs connected to said beam and said rectangular frame, and means for regulating the tension of said springs and for maintaining the predetermined initial position of said frame relative to said abutment, comprising threaded adjusting members, bolts having shanks internally and externally screw threaded to engage the convolutions of said springs and said adjusting members respectively, the shank of each bolt having a portion thereof constructed and arranged to be engaged by an instrument for turning the shank, whereby to adjust the position of said threaded shank relative to the convolutions of its spring and thereby to alter the effective length of said spring, each threaded adjusting member passing freely through a bore in the base of the rectangular frame and having means thereon for engaging the under side of said base, each threaded adjusting member being constructed and arranged to be engaged by an instrument to be turned thereby, and means for preventing the inadvertent turning of each adjusting member.

In testimony that I claim the foregoing as my invention, I have hereunto set my hand.

MATHIAS J. WEBER.